United States Patent [19]

Müller

[11] 3,854,339

[45] Dec. 17, 1974

[54] PROCESS AND DEVICE FOR BALANCING OF ROTORS

[75] Inventor: Richard Müller, Worfelden, Germany

[73] Assignee: Gebr. Hofmann KG, Darmstadt, Germany

[22] Filed: Aug. 31, 1973

[21] Appl. No.: 393,309

[30] Foreign Application Priority Data

Sept. 1, 1972 Germany.............................. 2243002

[52] U.S. Cl. .................................... 73/462, 73/464
[51] Int. Cl. ............................................ G01m 1/16
[58] Field of Search ....... 73/462, 464; 318/265, 467

[56] References Cited
UNITED STATES PATENTS 3,616,686  11/1971  Lash ................................ 73/462 X

*Primary Examiner*—James J. Gill
*Attorney, Agent, or Firm*—Cushman, Darby and Cushman

[57] ABSTRACT

A method and apparatus or balancing rotors, such as rotors for motors, in which the rotation of parts such as teeth are inductively sensed by a fixed sensor to produce a pulse train which is counted to provide a phase relative signal. The phase relative signal is then employed to stop the rotor at any given position for removal of mass in balancing.

11 Claims, 8 Drawing Figures

PROCESS AND DEVICE FOR BALANCING OF ROTORS

The invention relates to a process and apparatus for balancing of rotors, the outside form or manner of which makes possible a balancing of the mass only in certain predetermined angular components.

For known balancing machines, a fixed phase and synchronous reference signal is usually required for the rotation of the rotor. The angular position of the imbalance determined by the balancing machine represents a measure for the angular position of the imbalance relative to this phase reference signal, or in the case of balancing machines with an indicator for the component, the determined angular components refer to the angular position of the phase reference signal.

In the case of certain rotors, for example in the case of electric motor armatures, the mass balance is frequently carried out by milling off at the teeth of the packet of metal sheets. These teeth are mostly distributed symmetrically over the circumference of the rotor. The angular components in which the measurement of the imbalance is to be carried out are consequently determined by the arrangement of the teeth or by a part of the teeth. In the case of known balancing machines an optical marking is applied to one of the teeth or to their edge, which marking is scanned by a photoelectric cell and which delivers one impulse per turn of the rotor, which impulse serves as a phase reference for the measuring of the imbalance. An arrangement of this type is described in German published application No. 1,103,637. By this measure it will be assured that the phase reference always lies in a strict angular connection to the angular components provided for the processing. The photoelectric scanning of a groove or of a projection on the collector or of a groove on the axis has not turned out well in practice because the phase reference between just that marking and the teeth of the rotor package has not been ascertained absolutely. As a result, the measured components of imbalance do not always agree with the components provided for the processing and faults will develop during balancing.

On the other hand, application of an optical marking on a tooth of the rotor, especially in the case of automatic balancing machines with a high productive performance, is therefore connected with difficulties because the color applied does not dry quickly enough. Beyond that, this color marking often must be applied to the rotor by hand. Certain care must necessarily be taken that the edge of this color marking is applied, in fact, always at the same support of the tooth, so that no angular errors develop during measurement. Also marking of the rotor with a color presupposes an additional operation and thus additional costs. In the case of fully automatic balancing machines, the color marking moreover must again be discovered after stopping of the rotor, so that the rotor can be grooved into the right component at an automatic processing station.

It is now the object of this invention to illustrate a process and a device, especially for automatic balancing machines, which are provided in such an outward form for balancing of rotors, that will permit a balancing of the mass only at certain angular components, for example, of electric motor armatures, in case of which the phase relationship required for the measurement of the imbalance is assured without the use of a color marking, for the angular component provided later for processing, and in case of which the rotor is stopped automatically in a component suitable for the subsequent balance of the mass.

This object, in the case of a process of the initially mentioned type, is solved according to the invention through the fact that every angular component permitted for the balancing of the mass at the periphery of the rotor is scanned and that pulses assigned to the angular component are produced, which pulses are counted. After a number of pulses have been counted during the rotation of the rotor in the course of measurement, the phase reference signal is produced. After turning off of the driving engine, the phase reference signal or a signal which has a phase reference corresponding to the angular component to be used for the balancing of the measurement is used for stopping the rotor in an angular component suitable for balancing the mass.

The apparatus for balancing of rotors, which by its outside form or by its manner will permit a balancing of the mass only in certain predetermined angular components, has a photoelectric or magnetic scanning arrangement for scanning the outside shape of the rotor and for the production of a phase reference signal required for the measurement of imbalance.

For the solution of the above-mentioned object to the invention, all angular components provided at the periphery of the rotor for the balancing of the mass, for example, the teeth of the armature of an electric motor, are scanned and that in each case and for every angular component, an assigned pulse is produced. A counting circuit is provided which is coupled to the scanning arrangement and which supplies the phase reference signal as well as sector signals, whch starting out from the phase reference signal, correspond to certain angular sectors on the rotor. A logic circuit determines in which sector the imbalance vector lies. An electronic circuit operates the switching off arrangement for the rotor in dependence on the output signal at the logic circuit and of the corresponding sector signal of the counting circuit.

The angular components at the periphery of the rotor, for example, the teeth of an electric motor, admitted for the balancing of the mass, are scanned by a magnetic pulse generator or by a photoelectric cell and the pulses obtained in that way are delivered to a counting circuit, which in case of $n$ number of teeth per rotor rotation is reset after the $n$-th pulse to the starting position. For this counting circuit only one pulse, preferably the first one, is used as a phase reference signal for measuring imbalance. The measurement of the angular position of imbalance, or the measurement in components now refers to this impulse. After turning off of the driving motor for the rotor, preferably after achieving a certain lower number of rotations of the rotor, a certain pulse of the counting circuit is used for the sudden, complete stopping of the rotor, for example by an electromagnetic latch or by an electromagnet, so that the rotor will be stopped in a permissible component for the processing, suitable for the balancing of the mass.

The advantages achieved by the invention are as follows:

1. No reference marks for angles, such as for example colored dots or wedge grooves, are needed.
2. The rotor is stopped without loss of time on the measuring stand in a definite angular position.

3. The phase reference obtained according to the invention absolutely agrees with the angular component permitted for the processing.

The process and the arrangement according to the invention will be explained on the basis of the FIGS. and in connection with a subsequent description.

Figure 1:
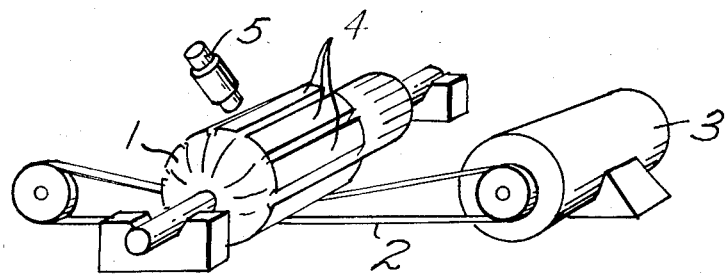
FIG. 1 shows a schematic view of a rotor in perspective driven in a balancing machine by friction.
Figure 2:
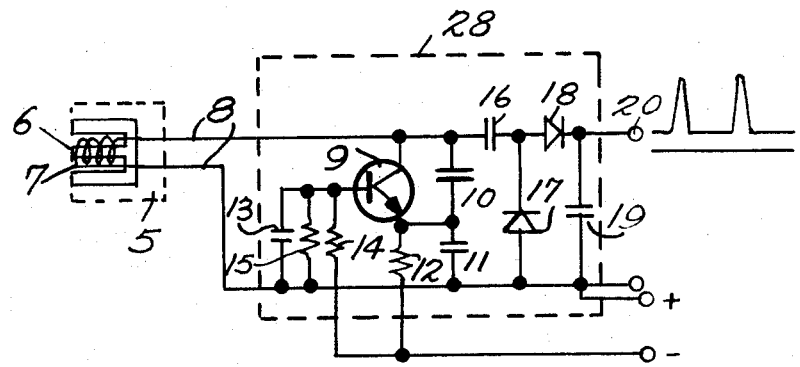
FIG. 2 is a circuit diagram of a scanning arrangement with an inductive sensor.

In FIG. 1, an armature or rotor 1 of an electric motor is conventionally mounted in two bearings of a balancing machine. Rotor 1 is rotated by means of its flexible belt 2 and by way of a motor 3 to the speed required for measurement of imbalance. The teeth 4 of the laminated core of rotor 1 are scanned by a locally fixed scanning arrangement 5 containing an inductive sensor. FIG. 2 shows this scanning arrangement which contains an inductive sensor and a pulse generator 28. Inductive sensor 5 includes a high frequency iron core 6, open on one side, which together with coil 7, constitutes an inductance. Coil 7 is connected by way of lines 8 with the collector of transistor 9 and, with regard to high frequency, is connected with the base of transistor 9 via capacitance 13. The capacitors 10 and 11, connected in series, constitute, together with the inductance, a resonance circuit. The connecting point of the two circuit capacitances 10 and 11 is connected with the emitter of transistor 9. Resistance 12 serves as an operating resistance for the DC current circuit of transistor 9, while resistances 14 and 15 provide base bias for transistor 9. The values of capacitors 10 and 11 are chosen with capacitor 11 considerably larger than capacitor 10, and the relationship of capacitance corresponds approximately to the amplification of current of transistor 9. In this manner, the circuit produces a high frequency oscillation, the frequency of which is given by the inductance and the series connection of the capacitors 10 and 11 connected in parallel thereto. If metal is brought close to the open air gap in the arm core 6, then the damping of the oscillator circuit changes and thus also the high frequency amplitude signal produced. The high frequency amplitude signal is uncoupled by way of a capacitor 16, rectified by diodes 17 and 18 and smoothed by capacitor 19, so that a positive direct current voltage develops at one output terminal 20 of the circuit, which voltage upon bringing a metal close to the sensor head of the inductance sensor 5 becomes smaller. During passing by of the teeth of an armature of an electric motor by the inductance sensor 5, there will consequently be a relatively low positive voltage present at the contact 20. Each time one of the gaps moves past, this voltage however will suddenly become more positive, so that a signal 21, according to FIG. 2, is produced.

Figure 3:
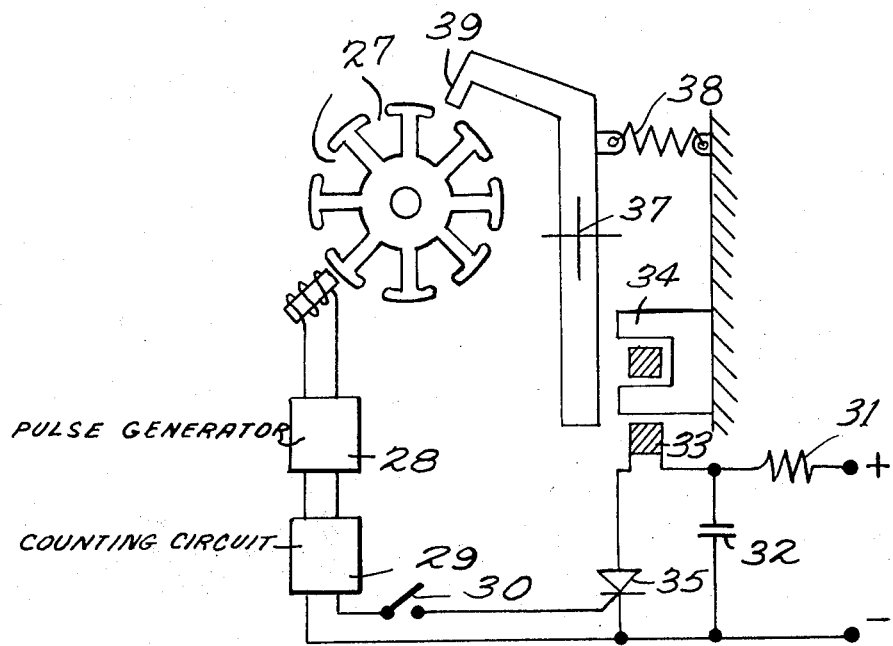
FIG. 3 is an arrangement for the inductive scanning of the surface for the armature of an electric motor in connection with an arrangement for stopping.

In FIG. 3, rotor 1 is to be driven to the rpm required for balancing. The gaps of teeth 27 consequently produce changes of damping in the inductance sensor 5, which changes create positive impulses at the output of pulse generator circuit 28. These positive impulses control a counting circuit 29, which is wired in such a way that it is reset always after as many impulses as there are teeth of the rotor. Such counting circuits are well known, for example, RCA COS/MOS Decade Counter Divider Type 4017 A, and are obtainable commercially as integrated circuits. The resetting pulse of the counter consequently takes place once during each revolution of rotor 1, so that a pulse develops which is phase-fixed with regard to the motor and which corresponds to the rpm of rotor 1.

Figure 4:
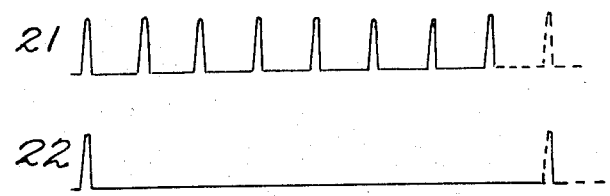
FIG. 4 is a group of impulses that are to be expected in an arrangement according to FIG. 3.

The pulse train, that is to be expected from the arrangement in FIG. 3 for an 8-pole rotor 1, is shown in FIG. 4. The pulse group 21 appears at the output of pulse generator 28. The reset pulse for counting circuit 29 is shown in FIG. 4 by the reference numeral 22. In order to stop rotor 1 in FIG. 3, switch 30 is manually or automatically closed and the reset pulse of counting circuit 29 is fed to the gate of thyristor 35. In the immediate vicinity of the rotor 1, there is a latch 39 attached on the balancing machine, which can be pivoted around the point of rotation 37. An armature 36 on the latch is kept at a distance during rotation of the rotor by means of a spring 38, so that latch 39 is in the immediate vicinity of the surface of the rotor. A capacitor 32 is charged to a high voltage by way of resistance 31. In case of switching off of the driving motor for rotor 1, switch 30 is closed and the thyristor 35 is fired by the next reset pulse. As a result, the capacitor charge of capacitor 32 is discharged through coil 33 and armature 36 is pulled toward magnetic bar 34 and latch 39 thus engages with one of the tooth gaps 27. The armature 36 is to be kept of low mass, so that the velocity of attraction will be sufficiently great. Since the attraction of the armature was caused by the reset pulse, latch 39 always engages with a tooth gap 27 which has a very definite phase relation in regard to the phase relation of the measured imbalance. A rotor stopped in this way will consequently always, for example, have its 0° angular reference position standing perpendicularly above in the balancing machine. The application of a marking for the angular relation is therefore no longer necessary.

Figure 5:
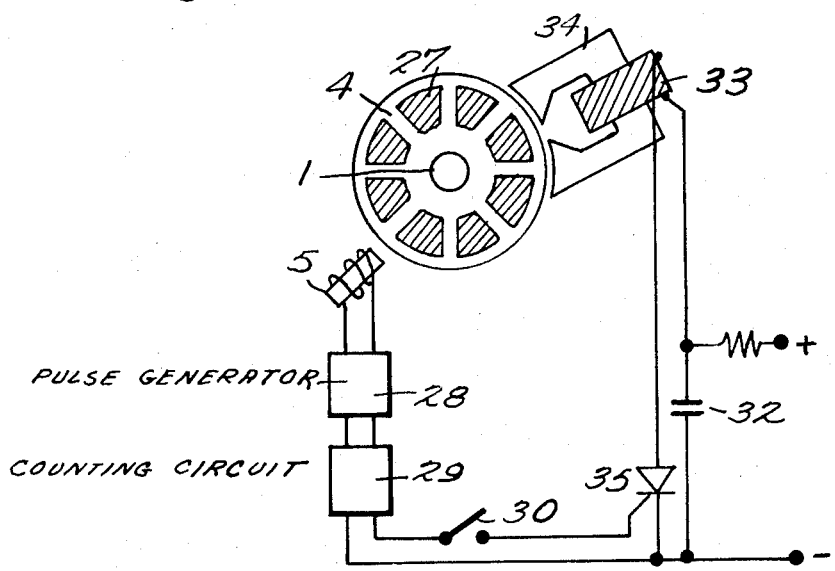
FIG. 5 is an arrangement for the inductive scanning of the surface of a rotor in connection with an electromagnetic stopping arrangement.

FIG. 5 shows a further embodiment according to the invention. The rotor 1, which is to be balanced has rotor teeth 4, whereby the tooth gaps 27 are filled in with an insulating material, so that the inductance sensor 5 delivers pulses during rotation, together with pulse generator 28. The pulses are stepped down in their frequency by counting circuit 29, so that phase-fixed pulses with the frequency of the rotor rpm develop at the output of counting circuit 29. These pulses, after switching off of the drive by way of switch 30, are fed to the gate of thyristor 35 and the charged capacitor 32 is discharged through the coil 33. In the coil there is a magnetic core 50, the pole shoes of which are developed in such a way that their distances from one another are selected fitting the distances of the rotor teeth 4 of the rotor 1. Upon turning off of the drive consequently, the next resetting impulse will discharge capacitor 32 through coil 33 and rotor 1 is stopped spontaneously.

Figure 6:
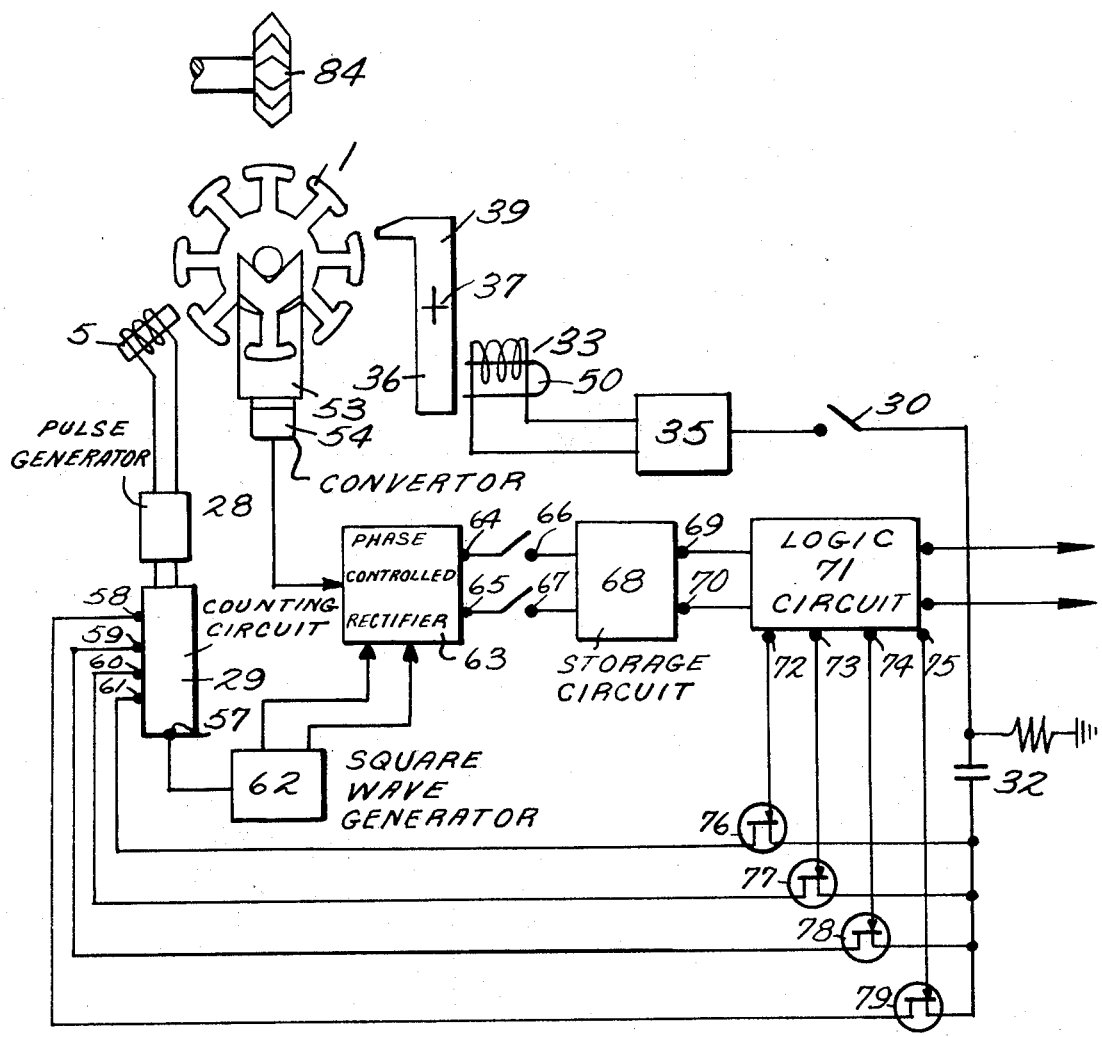
FIG. 6 is a further development of an arrangement according to FIG. 3 for measuring the imbalance in predetermined angular components and a stopping arrangement for stopping of the rotor at an angular component suitable for the processing.

If rotor 1 has too great a gyrating mass, the drive is braked down to a sufficiently low rpm after completed measurement of the imbalance and the switch 30 in FIG. 3, FIGS. 5 and 6 will be closed only then, so that upon insertion of the latch 39 in FIG. 3 and FIG. 6, no excessive forces will develop, or so that not too great a magnetic force is required in the case of the arrangement in FIG. 5 in order to bring the rotor to a stop.

Figure 7:
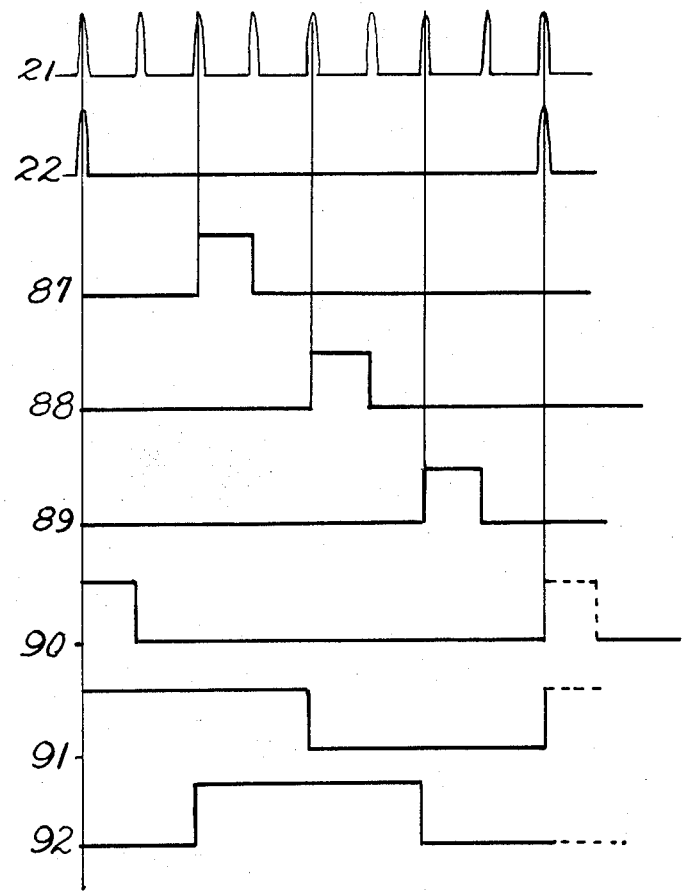
FIG. 7 is a group of impulses for explanation of FIG. 6.

In FIG. 6, a particularly advantageous embodiment of an arrangement according to the invention has been shown. The rotor 1 is inserted in a bearing of a balancing machine 53 as is driven by a drive (not shown). The oscillation brought about by the imbalance is converted by the electromechanical converter 54 into electric alternating voltage and is fed to an electronic multiplication arrangement, for example, a phase controlled rectifier 63. The surface of the rotor is scanned by the inductive sensor 5 and pulse generator 28, as required, delivers pulses which control counting circuit 29. The counting circuit 29 is developed in such a way that it is reset, as shown in FIGS. 4 and 7, after 8 counting impulses in the case of an 8-pole rotor, and that its counting then begins again. The resetting pulse is removed at the contact 57 of counting circuit 29 and is fed to a circuit 62, which, as is known from the German Federal Pat. No. 1,103,637, forms two square wave voltages 91 and 92 with 90° phase displacement in relation to one another. These two square wave voltages 91 and 92 are fed to controlled rectifier circuit 63, as known for example from the German Pat. No. 2,012,685. In this way, two D.C. voltages can be taken at the outlets 64 and 65 of this phase-sensitive D.C. circuit 63, which D.C. voltages correspond to the imbalance vector disassembled into the x- and y-components. The phase relationship of the two coordinates refers to the resetting pulse of counter 29. The resetting pulse, first of all related to the rotor, can have each one of the eight possible phase positions of the teeth. Once the rotor has been put into rotation, the phase position no longer changes. The counting circuit 29 is developed in such a way that beside the resetting pulse, further groups of pulses can be taken off at the terminals 58, 59, 60 and 61. These groups of pulses are shown in FIG. 7.

Figure 8:
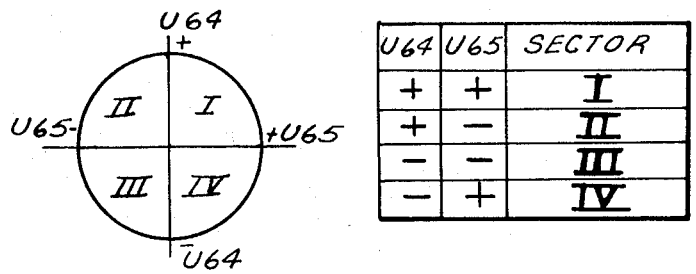
FIG. 8 is an explanation of the block 71 according to FIG. 6.

The pulses 21 represent the starting impulses of generator 28. The group of pulses 22 corresponds to the resetting pulse. The pulses 87 (FIG. 7) from the terminal 58 (FIG. 6) are displaced in relation to the resetting pulse by two further pulses, therefore by 90°. The pulses 88 (FIG. 7) are displaced in relation to the resetting pulse by four pulses, therefore by 180°, and the group of pulses 89 in FIG. 7 can be scanned at terminal 60 in FIG. 6, and is displaced by six pulses in relation to the resetting pulse. Pulse group 90 again corresponds to the phase position of the resetting pulses. It can be scanned at terminal 61. During the measurement of the imbalance, contacts 66 and 67 are closed, so that the starting D.C. voltages at the contacts 64 and 65 of the phase-sensitive rectifier circuit 63 in capacitors with series connected amplifiers with a high input impedance, are fed into a storage circuit 68 for the purpose of storage. After the balance has been determined, the contacts 66 and 67 are opened, whereupon the output voltages will remain at the exits 69 and 70 of the storage circuit 68 and will be fed to the inlet of a conventional logic circuit 71. This logic circuit recognizes, according to FIG. 8, in which of the angular sectors I, II, III or IV the imbalance is located. According to the diagram in FIG. 8, this will be recognized from the polarity of the two component voltages at the outputs 64 and 65 or 69 and 70. If, for example, both component D.C. voltages are positive, then the imbalance is in sector I. The logic circuit 71 is to be developed in such a way that in case of the imbalance in sector I, a contact 72 becomes positive, so that a field effect-transistor 76 becomes conductive. In the case of the presence of the imbalance in sector II, only terminal 73 is to be positive, while terminals 72, 74 and 75 remain negative, etc.

If the imbalance is located in sector I, then the field effect-transistor 76 is conductive. In that case, the group of impulses from terminal 61 of the counting circuit is fed to the contact 30 by way of a capacitor. After the drive of the rotor has been turned off, the switch 30 is closed and the thyristor circuit 35 is discharged in the prescribed manner to coil 33, so that latch 39 rotates about pivotal point 37 and stops rotor 1 in a certain position. The adjustment of the machine is to be carried out in such a way that the component of the rotor will then be located below the milling tool 84, which component is assigned to the positive component of the terminal 65. Consequently the rotor is stopped in the position in which the processing tool 84 can immediately start the milling process. When the milling process is completed, then rotor 1 merely needs to be turned by 90° clockwise and the second load component can be produced. If the imbalance is in some other sector, then the corresponding group of pulses will be taken out of counter 29 by way of the field effect-transistor assigned for this purpose and used for stopping of the rotor, so that the tool 84 will always be in a component which is correct for removal.

Naturally in the case of fully automatic machines, it is quite possible to stop the rotor in the measuring machine by means of an arrangement according to FIG. 6, then to hand it on by means of a transfer arrangement, so that the processing of the first component can be carried out in a second station, while another rotor already rotates in the measuring machine. After processing of the first components has been completed, the rotor can then be forwarded by means of a transfer to a next processing station and turned by 90°, so that the correct position for the second component will also be assured. It is also furthermore possible, in the case of two-plane balancing machines, to store properly the imbalance measured for the second plane and to refer its phase relationship to the first stopped component, so that in the case of fully automatic machines, the balance of the mass becomes possible in the two planes and several components.

Many changes and modifications in the above-described embodiment of the invention can, of course, be carried out without departing from the scope thereof. Accordingly, that scope is intended to be limited only by the scope of the appended claims.

What is claimed is:

1. Apparatus for stopping a rotor at a given position comprising:
   means for mounting a rotor for rotation,
   means for rotating the mounted rotor, means for sensing portions of a rotating rotor extending about its periphery and separated by areas having characteristics different from said portions and producing a train of pulses, each pulse being associated with a portion, means connected to said sensing means for receiving said train of pulses, counting said pulses and providing a reference pulse for each revolution of said rotor, and means responsive to said reference pulse for stopping said rotor in a given angular position.

2. Apparatus as in claim 1 wherein said sensing means includes means for inductively sensing teeth on said rotor.

3. Apparatus as in claim 2 wherein said inductively sensing means includes a coil.

4. Apparatus as in claim 1 wherein said stopping means includes a pivotably mounted latch member having a teeth-engaging portion, electromagnetic means for causing said latch member to pivot to a position engaging rotor teeth, electronic switching means actuating said electromagnetic means in response to receipt of a reference pulse and switch means connecting said receiving, counting and providing means to said electromagnetic means.

5. Apparatus as in claim 4 wherein said electromagnetic means includes a coil and said electronic switching means includes a capacitor, means for charging said capacitor, and an electronic switch connecting said capacitor to said coil and connected to said switch means so that said electronic means completes a current path permitting said capacitor to discharge through said coil when said reference pulse is applied to said electronic means so that said coil causes said latch member to pivot and engage said teeth.

6. Apparatus as in claim 5 wherein said electronic means is a thyristor.

7. Apparatus as in claim 5 wherein said stopping means includes a spring urging said latch member to pivot out of engagement with said teeth.

8. Apparatus as in claim 1 wherein said stopping means includes a magnetic latch.

9. Apparatus as in claim 1 wherein said reference pulse is the reset pulse of said receiving, counting and providing means.

10. Apparatus as in claim 1 further including a circuit connected in series to receiving, counting and providing means which circuit forms two rectangular pulses with 90° phase displacement from said reference pulse, a controlled rectifier circuit which receives these rectangular pulses as well as the signals created by the oscillations of imbalance and supplies two D.C. voltages corresponding to the $x$- and $y$-components of the imbalance 11. A method for stopping a rotor at a given position comprising:

sensing portions of a rotor extending about its periphery and separated by areas having characteristics different from said portions and producing a train of pulses, each pulse being associated with a portion, counting said pulses and providing a reference pulse for each revolution of said rotor, and responsive to said reference pulse stopping said rotor in a given angular position.

* * * * *

Disclaimer 3,854,339.—*Richard Muller*, Worfelden, Germany. PROCESS AND DEVICE FOR BALANCING OF ROTORS. Patent dated Dec. 17, 1974. Disclaimer filed July 7, 1978, by the assignee, *American Hofmann Corporation*.

Hereby enters this disclaimer to claim 10 of said patent.

[*Official Gazette August 29, 1978.*]